(12) United States Patent
Lerner (10) Patent No.: US 7,073,909 B2
(45) Date of Patent: Jul. 11, 2006

(54) OPTICAL SYSTEMS AND METHODS

(75) Inventor: Scott Lerner, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 77 days.

(21) Appl. No.: 10/901,741

(22) Filed: Jul. 29, 2004

(65) Prior Publication Data

US 2006/0023176 A1 Feb. 2, 2006

(51) Int. Cl.
*G03B 21/28* (2006.01)
(52) U.S. Cl. .......................... 353/20; 353/99
(58) Field of Classification Search ................ 353/20, 353/98, 99, 122; 349/5, 7, 8, 9
See application file for complete search history.

(56) References Cited

U.S. PATENT DOCUMENTS

| | | | |
|---|---|---|---|
| 5,629,801 A | 5/1997 | Staker et al. | |
| 5,853,240 A * | 12/1998 | Tanaka et al. | 353/20 |
| 6,111,700 A * | 8/2000 | Kobayashi et al. | 359/627 |
| 6,256,151 B1 | 7/2001 | MaGuolin et al. | |
| 6,520,643 B1 * | 2/2003 | Holman et al. | 353/20 |
| 6,557,999 B1 * | 5/2003 | Shimizu | 353/20 |
| 6,578,968 B1 | 6/2003 | Bierhuizen et al. | |
| 6,840,623 B1 * | 1/2005 | Li | 353/20 |
| 6,910,772 B1 * | 6/2005 | Yano | 353/20 |
| 2002/0154273 A1 | 10/2002 | Seo et al. | |
| 2003/0223044 A1 * | 12/2003 | Janssen | 353/20 |
| 2004/0066471 A1 * | 4/2004 | Bierhuizen | 349/9 |

FOREIGN PATENT DOCUMENTS

EP 0 361 559 A 4/1990

* cited by examiner

*Primary Examiner*—William C. Dowling (57) ABSTRACT

Methods and apparatus are provided. Light is received at a modulator of a projector. The light is reflected from the modulator, returned to the modulator, and re-reflected from the modulator.

29 Claims, 5 Drawing Sheets

OPTICAL SYSTEMS AND METHODS

BACKGROUND

Digital projectors often include micro-displays that include arrays of pixels (e.g., 1280×1024, etc.) Each pixel usually includes a micro-electromechanical system (MEMS) device, such as a micro-mirror, liquid crystal on silicon (LcoS) device, interference-based modulator, etc. A micro-display is used with a light source and projection lens of the digital projector. The micro-display receives light from the light source. When the pixels of the micro-display are ON, the pixels direct the light to the projection lens. The projection lens images and magnifies the micro-display. When the pixels are OFF, they direct the light from the light source away from the projection lens. However, some light may still be directed to the projection lens when the pixels are OFF, e.g., due to reflections from packaging of the micro-display, etc. This degrades the "Black/White Contrast ratio" that is often defined as the ratio of the light imaged by the projection lens when all of the pixels in the micro-display are ON to the light imaged by the projection lens when all of the pixels are OFF and is a measure of the blackness of the projector's black state.

SUMMARY

One embodiment of the invention provides a method of operating a projector that includes receiving light at a modulator of the projector, reflecting the light from the modulator, returning the reflected light to the modulator, and re-reflecting the reflected light from the modulator.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

Figure 1:
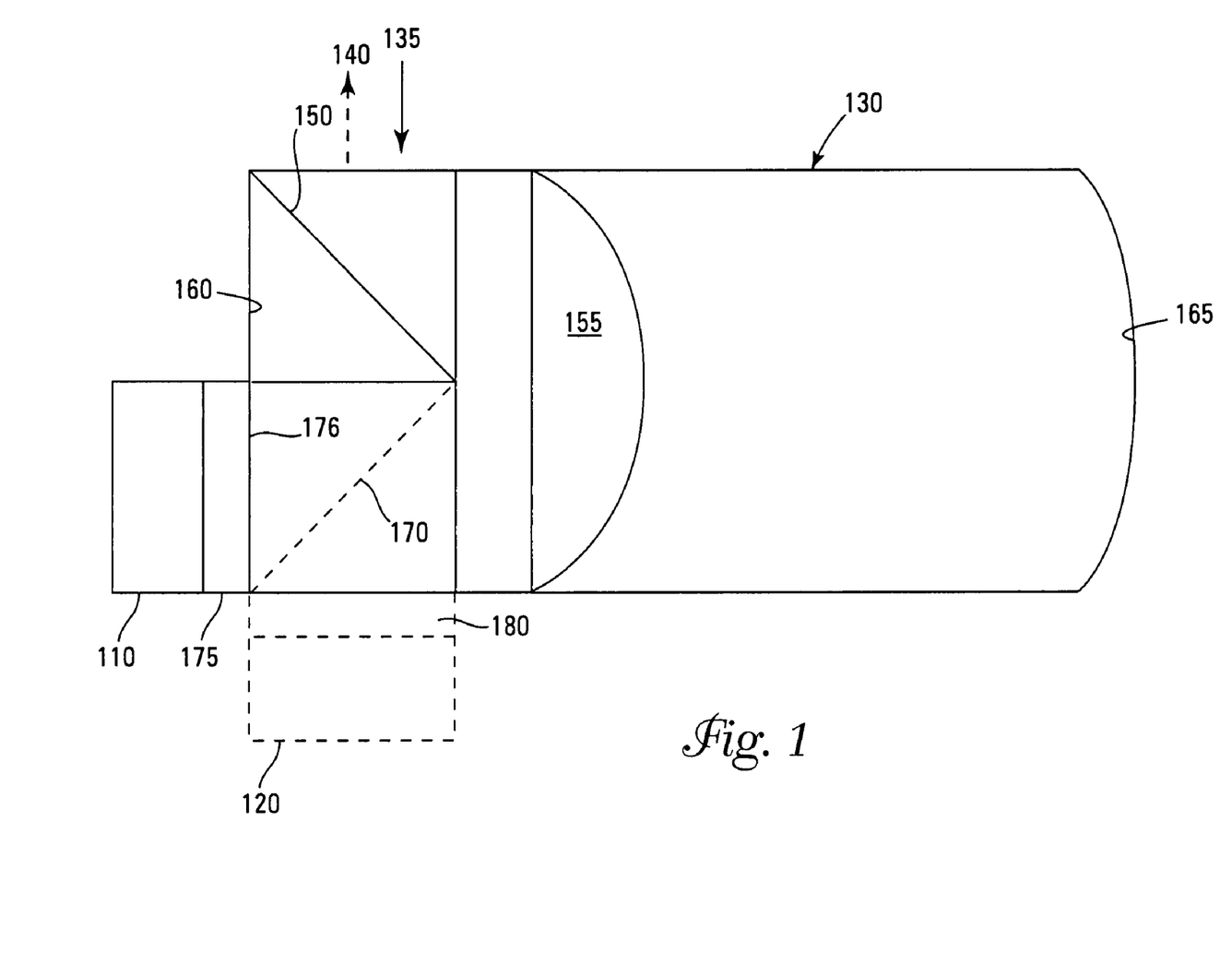
FIG. 1 illustrates a portion of a projector, according to an embodiment of the invention.

FIG. 1 illustrates a portion of a projector, e.g., for use in a front or rear projection system, according to an embodiment of the invention. The projector includes a light modulator 110. For one embodiment, light modulator 110 is a multi-color modulator, e.g., red, blue, and green. For another embodiment, light modulator 110 is a single color, such as red, and another modulator 120, shown by dashed lines, is a two-color modulator, such as blue and green. Modulators 110 and 120 may include pixilated MEMS devices, such as micro-mirrors, or interference-based modulators, LCD devices, etc. An optical system 130 is included for receiving light from a light source 135 and delivering the light to modulator 110 or modulators 110 and 120. Optical system 130 also delivers modulated light from modulator 110 or modulators 110 and 120 to an outlet 140 of the projector.

Optical system 130 includes a polarizer (or polarizing beam splitter) 150, such as a polarizing beam spitting cube or plate. Polarizer 150 is located between modulator 110 and a lens 155. Polarizer 150 is also located between a mirror 160 and lens 155. Lens 155 is located between polarizer 150 and a mirror 165. Polarizer 150 passes light having one polarization and reflects light having another polarization. For embodiments having modulators 110 and 120, a dichroic beam splitter 170, such as a dichroic beam spitting cube or plate, is located between polarizer 150 and modulator 120 and between modulator 110 and lens 155. Dichroic beam splitter 170 separates light according to its color, e.g., dichroic beam splitter 170 may pass red light to modulator 110 and reflect blue and green light to modulator 120.

A quarter wavelength plate 175 is located between polarizer 150 and modulator 110. For one embodiment, quarter wavelength plate 175 is butted against modulator 110. For another embodiment, a face 176 of quarter wavelength plate 175 is substantially co-planer with mirror 160. For another embodiment, a quarter wavelength plate 180 is located between modulator 120 and dichroic beam splitter 170.

For one embodiment, optical system 130 may be formed as a transparent solid, such as glass, so that the various components or optical system are integral with the solid. That is, the material of the transparent solid physically interconnects the elements. For another embodiment, the components of optical system are physically discrete, i.e., are not physically connected. For example, gas filled spaces, e.g., air, or evacuated spaces may separate the components of optical system 130.

Figure 2A:
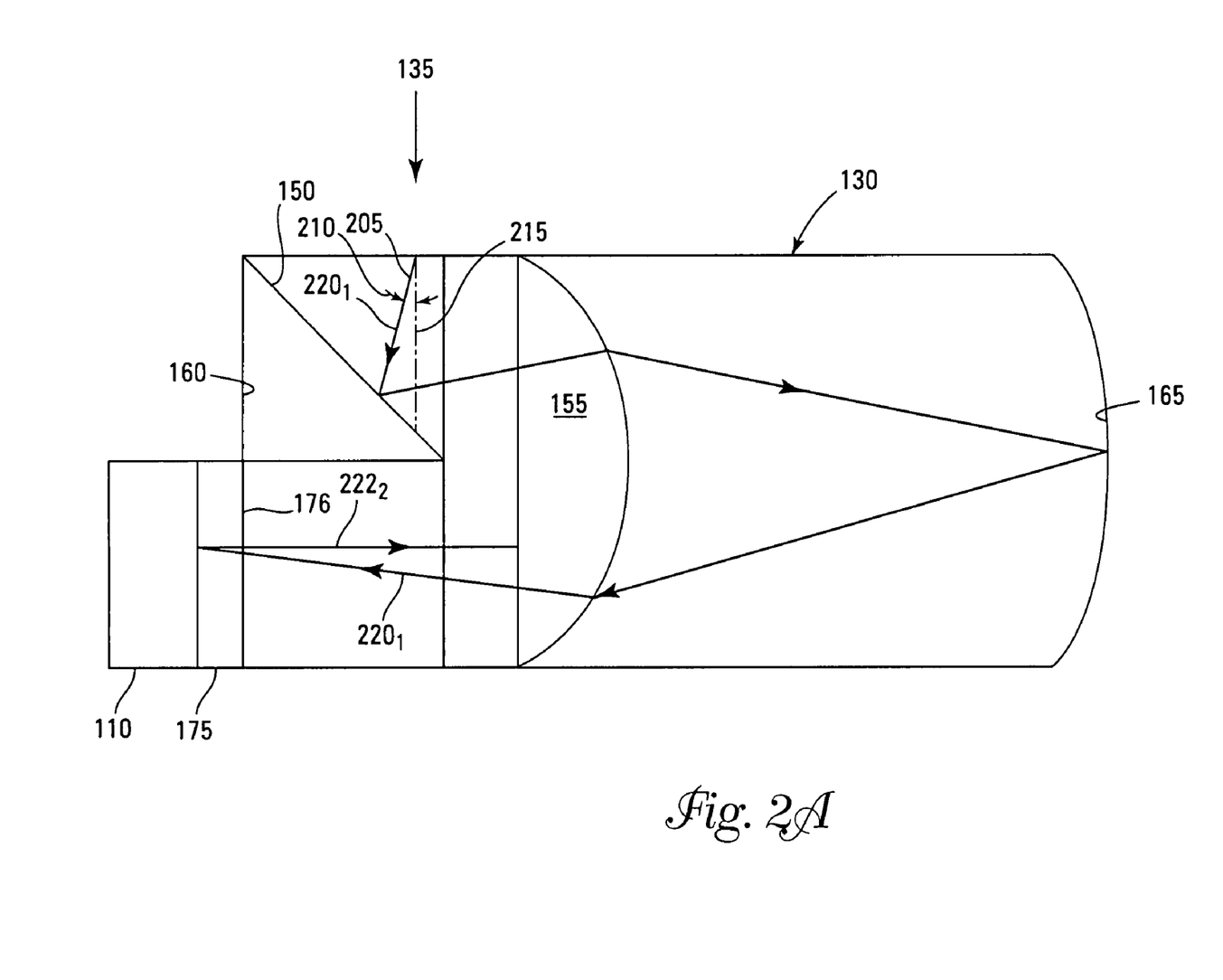
FIGS. 2A–2D illustrate a portion of a projector in operation, according to another embodiment of the invention.

FIGS. 2A–2D illustrate optical system 130 in operation, according to another embodiment of the invention. Optical system 130 receives linearly (or plane) polarized light at a first polarization from light source 135. The light enters optical system 130 along an illumination path 205, as shown in FIG. 2A. For one embodiment, illumination path 205 is contained within an angle 210 with respect to an axis 215 that is substantially parallel to face 176 of quarter wavelength plate 175 (FIG. 2A).

As shown in FIG. 2A, the incoming light rays, represented by a ray $220_1$, are reflected off polarizer 150 to lens 155. The subscript "1" of "220" is used to denote the first polarization. Ray $220_1$ is refracted upon exiting lens 155 and is subsequently reflected by mirror 165 to lens 155. Ray $220_1$ is refracted upon exiting lens 155 and enters quarter wavelength plate 175. Note that the polarization of ray $220_1$ changes, e.g., becomes circularly polarized, when it passes through quarter wavelength plate 175. However, the subscript "1" will be retained for purposes of discussion.

When modulator 110 is on it reflects substantially all of the light of ray $220_1$, back through quarter wavelength plate 175. Passing ray $220_1$ through quarter wavelength plate 175, reflecting it back through quarter wavelength plate 175 using modulator 110 rotates the polarization of ray $220_1$ to a second linear (or plane) polarization upon exiting quarter wavelength plate 175 that is orthogonal to the first polarization. Specifically, the circularly polarized light changes to linearly (or plane) polarized light at the second polarization when it passes back through quarter wavelength plate 175. The exiting ray is referred to as ray $222_2$, where the subscript "2" denotes the second polarization, as shown in FIG. 2A.

When modulator 110 is off, it absorbs and/or transmits most of the light of ray $220_1$ and/or reflects the light of ray $220_1$ away from optical system 130. The remaining fraction is reflected from modulator 110 back into optical system 130. This reflected light passes back through quarter wavelength plate 175 so that the polarization of ray 220₁ is rotated to the second polarization upon exiting quarter wavelength plate 175, as just described, as the ray 222₂. Therefore, ray 222₂ contains substantially all of the light that ray 220₁ does when modulator 110 is on and a fraction of the light that ray 220₁ does when modulator 110 is off.

Note that for embodiments that include modulators 110 and 120 and dichroic beam splitter 170, dichroic beam splitter 170 reflects one or more color components of ray 220₁ corresponding to modulator 120 and passes one or more color components of ray 220₁ corresponding to modulator 110.

Figure 2B:
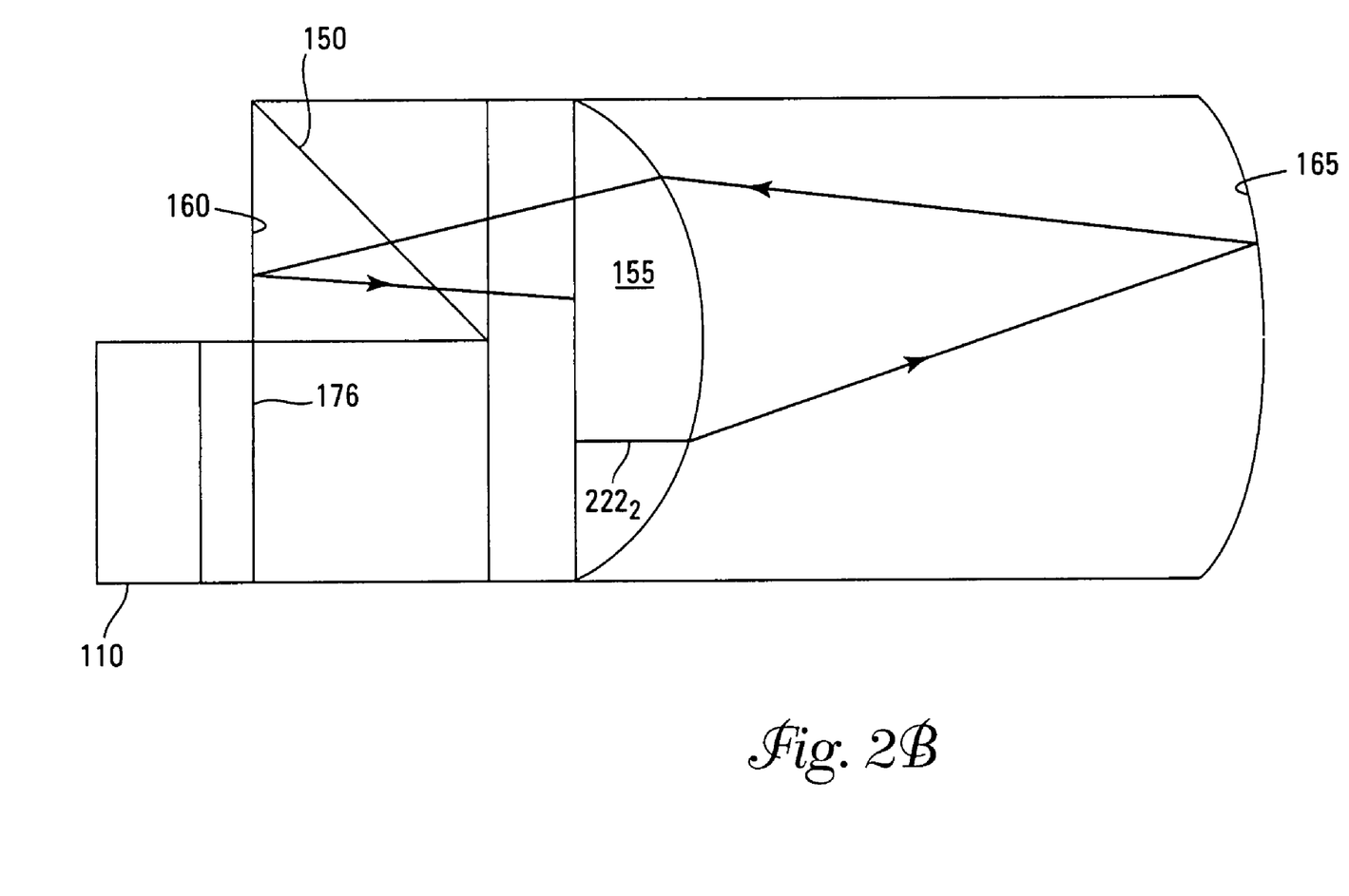

As shown in FIG. 2A ray 222₂ enters lens 155. FIG. 2B shows ray 222₂ passing through lens 155 and being refracted onto mirror 165 upon exiting lens 155. Mirror 165 reflects ray 222₂ back to lens 155. Ray 222₂ is refracted upon entering lens 155 and subsequently passes therethrough to polarizer 150. Polarizer 150 passes ray 222₂ therethrough and onto mirror 160. Mirror 160 reflects ray 222₂ to lens 155.

Figure 2C:
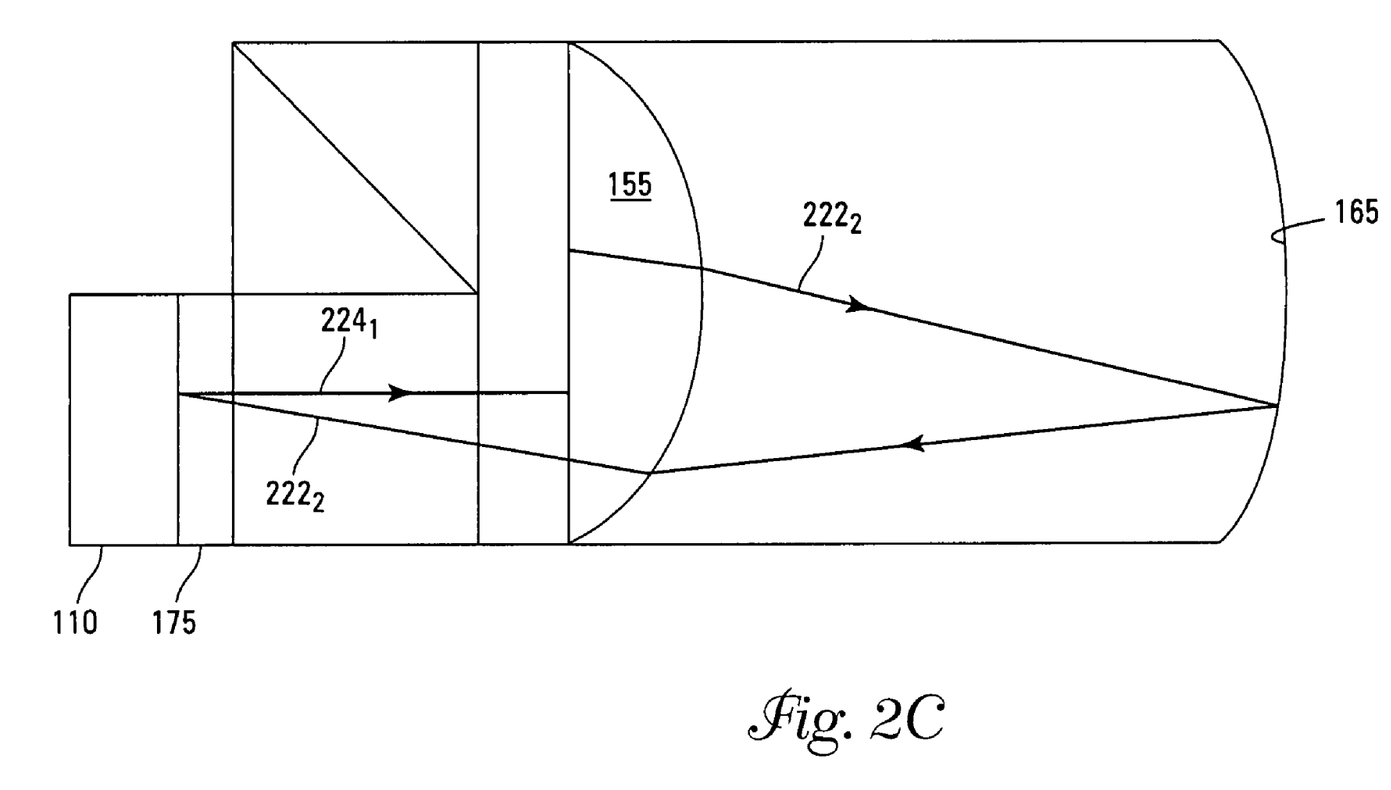

FIG. 2C shows ray 222₂ passing through lens 155 and being refracted onto mirror 165 upon exiting lens 155. Mirror 165 reflects ray 222₂ back to lens 155. Ray 222₂ is refracted upon entering lens 155 and subsequently passes therethrough to quarter wavelength plate 175. Ray 222₂ passes through quarter wavelength plate 175 and reflects off modulator 110 back through quarter wavelength plate 175. As described above this rotates the polarization of ray 222₂ orthogonally back to the first polarization so that a ray 224₁ exits quarter wavelength plate 175 and enters lens 155.

Note that for the reasons described above, ray 224₁ contains substantially all of the light that ray 222₂ does when modulator 110 is on and a fraction of the light that ray 222₂ does when modulator 110 is off. This means that when modulator 110 is off ray 224₁ is blacker than ray 222₂ and thus the contrast is improved compared to passing the light into modulator 110 only once while modulator 110 is in the off state. Moreover, when modulator 110 is off and since ray 222₂ contains a fraction of the light of the ray 220₁ when ray 220₁ enters quarter wavelength plate 175 in FIG. 2A, ray 224₁ contains a fraction of a fraction, e.g., about a square of the fraction, of the light of the ray 220₁.

Figure 2D:
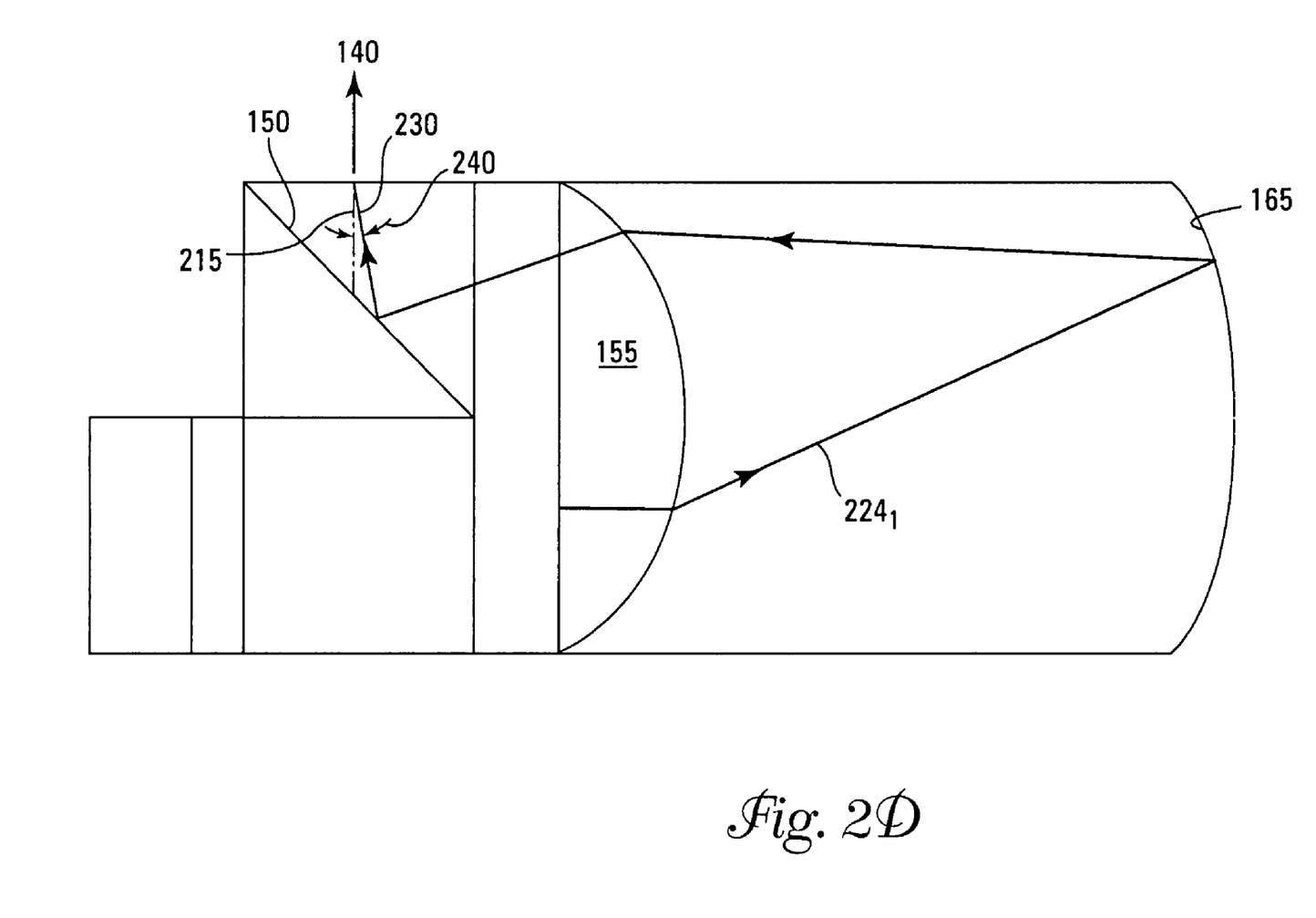

FIG. 2D shows ray 224₁ passing through lens 155 and being refracted onto mirror 165 upon exiting lens 155. Mirror 165 reflects ray 224₁ back to lens 155. Ray 224₁ is refracted upon entering lens 155 and subsequently passes therethrough to polarizer 150. Polarizer 150 reflects ray 224₁ to a projection path 230 and to outlet 140 of the projector, as shown in FIG. 2D. For one embodiment, projection path 230 is contained within an angle 240 with respect to axis 215. Comparing the projection path 230 of FIG. 2D with the illumination path 205 of FIG. 2A shows that the angle 210 containing illumination path 205 and the angle 240 containing projection path 230 are on opposite sides of axis 215. This separates illumination path 205 from projection path 230.

Note that due to the polarization state of the light at polarizer 150, polarizer 150 does not allow light to exit optical system 130 until it passes into modulator 110 twice. When modulator 110 is off, this reduces the light exiting system 130, thereby producing blacker blacks and a higher contrast.

CONCLUSION

Although specific embodiments have been illustrated and described herein it is manifestly intended that this invention be limited only by the following claims and equivalents thereof.

What is claimed is:

1. A method of operating a projector, comprising:
   receiving light at a modulator of the projector;
   reflecting the light from the modulator, producing first reflected light;
   returning the first reflected light to the modulator;
   passing the light through a quarter wavelength plate prior to receiving that light at the modulator and passing the first reflected light through the quarter wavelength plate prior to returning the first reflected light to the modulator; and
   re-reflecting the light from the modulator, producing second reflected light.

2. The method of claim 1, wherein returning the first reflected light to the modulator comprises changing a polarization of the first reflected light, wherein changing the polarization enables the first reflected light to be returned to the modulator.

3. The method of claim 2, wherein returning the first reflected light to the modulator further comprises reflecting the first reflected light at the changed polarization to the modulator.

4. The method of claim 3, wherein returning the first reflected light to the modulator further comprises refracting the first reflected light at the changed polarization after reflecting the first reflected at the changed polarization.

5. The method of claim 4, wherein returning the first reflected light to the modulator further comprises reflecting the refracted first reflected light at the changed polarization to the modulator.

6. The method of claim 1 further comprises:
   directing the light along an illumination path of the projector to a polarizer of the projector prior to receiving that light at the modulator;
   reflecting the light off the polarizer prior to receiving that light at the modulator; and
   passing the second reflected light re-reflected from the modulator through the polarizer and along a projection path of the projector.

7. The method of claim 1 further comprises:
   removing at least one color component from the light before receiving the light at the modulator; and
   sending the at least one color component to another modulator of the projector.

8. The method of claim 1, wherein the first reflected light contains a fraction of the light received at the modulator and the second reflected light contains a fraction of the first reflected light.

9. A method of operating a projector, comprising:
   receiving light at a modulator of the projector;
   reflecting the light from the modulator, producing first reflected light;
   returning the first reflected light to the modulator;
   re-reflecting the light from the modulator, producing second reflected light;
   directing the light along an illumination path of the projector to a polarizer of the projector prior to receiving that light at the modulator;
   reflecting the light off the polarizer prior to receiving that light at the modulator;

passing the second reflected light re-reflected from the modulator through the polarizer and along a projection oath of the projector; and wherein the illumination path is contained within a first angle relative to an axis substantially parallel to a face of the modulator and the projection path is contained within a second angle relative to the axis, wherein the first and second angles are on opposite sides of the axis.

10. A method of operating a projector, comprising:
reflecting a fraction of light arriving at a modulator from the modulator;
changing a polarization of the fraction of the light to a first polarization;
passing the fraction of light through a polarizer of the projector to return the fraction of the light to the modulator;
reflecting a fraction of the fraction of the light from the modulator;
changing the polarization of the fraction of the fraction of the light to a second polarization;
reflecting the fraction of the fraction of the light off the polarizer to a projection path of the projector.

11. The method of claim 10, wherein changing a polarization of a fraction of light to a first polarization comprises:
passing the light through a quarter wavelength plate; and
reflecting the fraction of the light from the modulator back through the quarter wavelength plate.

12. The method of claim 11, wherein changing the polarization of the fraction of the fraction of the light to a second polarization comprises:
passing the fraction of the light through the quarter wavelength plate; and
reflecting the fraction of the fraction of the light from the modulator back through the quarter wavelength plate.

13. The method of claim 10, wherein returning the fraction of the light to the modulator further comprises:
reflecting the fraction of the light off a first mirror to a lens after it passes through the polarizer;
refracting the fraction of the light through the lens to a second mirror; and
reflecting the fraction of the light off the second mirror to the modulator.

14. The method of claim 10 further comprises directing the light along an illumination path of the projector before it arrives at the modulator, wherein the illumination path is contained within a first angle relative to an axis substantially parallel to a face of the modulator and the projection path is contained within a second angle relative to the axis, wherein the first and second angles are on opposite sides of the axis.

15. A method of operating a projector, comprising:
reflecting a first beam of light having a first polarization off a polarizer of the projector to a lens of the projector;
refracting the first beam through the lens onto a first mirror of the projector;
reflecting the first beam back to the lens from the first mirror;
refracting the first beam through the lens onto a quarter wavelength plate of the projector;
passing the first beam through the quarter wavelength plate and into a modulator of the projector;
reflecting a second beam from the modulator and back through the quarter wavelength plate and onto the lens, wherein the second beam is at a second polarization;
refracting the second beam through the lens onto the first mirror;
reflecting the second beam back to the lens from the first mirror;
refracting the second beam through the lens to the polarizer;
passing the second beam through polarizer onto a second mirror of the projector;
reflecting the second beam off the second mirror back to the lens;
refracting the second beam through the lens onto the first mirror;
reflecting the second beam back to the lens from the first mirror;
refracting the second beam through the lens onto the quarter wavelength plate;
passing the second beam through the quarter wavelength plate and into the modulator;
reflecting a third beam from the modulator and back through the quarter wavelength plate and onto the lens, wherein the third beam is at the first polarization;
refracting the third beam through the lens onto the first mirror;
reflecting the third beam back to the lens from the first mirror;
refracting the third beam through the lens to the polarizer; and
reflecting the third beam from polarizer to a projection path of the projector.

16. The method of claim 15, wherein the second beam contains a fraction of the light of the second beam and the third beam contains a fraction of the light of the second beam.

17. An optical system adapted to direct light to and from a modulator, the optical system comprising:
a polarizer for passing light having a first polarization that has been reflected once by the modulator back to the modulator and for reflecting light having a second polarization that has been reflected twice by the modulator to an exit of the optical system; and
a quarter wavelength plate located between the modulator and the polarizer for changing the polarization of the light from the first to second polarization.

18. The optical system of claim 17 further comprises a mirror for reflecting the light having the first polarization back to the modulator after it passes through the polarizer.

19. The optical system of claim 17, wherein the polarizer is located between a first mirror and a lens and the lens is located between the polarizer and a second mirror.

20. The optical system of claim 17, wherein the polarizer is a polarizing beam spitting cube or plate.

21. The optical system of claim 17 further comprises a dichroic beam splitter located so that the quarter wavelength plate is located between the modulator and the dichroic beam splitter, wherein the dichroic beam splitter is for passing at least one color component of the light to the modulator and for reflecting at least one other color component of the light to another modulator.

22. An optical system adapted to direct light to and from a modulator, the optical system comprising:
a polarizer;
first and second mirrors located on either side of the polarizer;
a lens located between the polarizer and the second mirror; and
a quarter wavelength plate located between the modulator and the polarizer;
wherein light of a first polarization is reflected from the polarizer through the lens to the second mirror and through the quarter wavelength plate to be reflected from the modulator a first time back through the quarter wavelength plate, thereby obtaining a second polarization orthogonal to the first polarization, to the second mirror, the lens, and through the polarizer to the first mirror.

23. The optical system of claim 22 further comprises a dichroic beam splitter located between the modulator and the lens and between the polarizer and another modulator.

24. The optical system of claim 22, wherein light from the first mirror is reflected back through the polarizer, the lens and the second mirror and again through the quarter wavelength plate back to the modulator to be reflected a second time through the quarter wave plate, thereby obtaining the first polarization, to the second mirror and lens to be reflected from the polarizer to exit the optical system.

25. An optical system adapted to direct light to and from a modulator, the optical system comprising:
a means for directing light after it has been reflected once by the modulator back to the modulator and for directing the light to an exit of the optical system after the light has been reflected twice by the modulator;
wherein the means for directing light includes means for first circularly polarizing the light prior to the modulator and secondly polarizing the light reflected once by the modulator to replanarize the light prior to returning the light reflected once by the modulator back to the modulator.

26. The optical system of claim 25, wherein the means for directing light after it has been reflected once by the modulator back to the modulator comprises a means for preventing light having a first polarization from being directed to the exit.

27. The optical system of claim 26, wherein the means for directing the light to an exit of the optical system after the light has been reflected twice by the modulator comprises a means for allowing light having a second polarization to pass to the exit.

28. The optical system of claim 27 wherein the means for first circularly once circular polarizing the light prior to the modulator and secondly polarizing the light first reflected once by the modulator includes a means for changing the polarization of the light between the first and second polarizations.

29. The optical system of claim 25 further comprises a means for passing at least one color component of the light to the modulator and for reflecting at least one other color component of the light to another modulator.

* * * * *

UNITED STATES PATENT AND TRADEMARK OFFICE
CERTIFICATE OF CORRECTION

PATENT NO. : 7,073,909 B2 Page 1 of 1
APPLICATION NO. : 10/901741
DATED : July 11, 2006
INVENTOR(S) : Lerner It is certified that error appears in the above-identified patent and that said Letters Patent is hereby corrected as shown below:

In the Claims

Col. 5 (line 3), delete "oath" and insert therefor --path--.

Signed and Sealed this

Twelfth Day of June, 2007

JON W. DUDAS
*Director of the United States Patent and Trademark Office*